US012085973B1

(12) United States Patent
McMahan et al.

(10) Patent No.: US 12,085,973 B1
(45) Date of Patent: Sep. 10, 2024

(54) SPRING GUIDED HAND ACTUATOR FOR AIRCRAFT COMPONENT

(71) Applicant: Rohr, Inc., Chula Vista, CA (US)

(72) Inventors: Paul F. McMahan, College Station, TX (US); Braskel Phillips, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/208,063

(22) Filed: Jun. 9, 2023

(51) Int. Cl.
*G05G 1/02* (2006.01)
*B64D 29/06* (2006.01)
*G05G 5/05* (2006.01)

(52) U.S. Cl.
CPC .............. *G05G 1/02* (2013.01); *G05G 5/05* (2013.01); *B64D 29/06* (2013.01)

(58) Field of Classification Search
CPC . G05G 1/02; G05G 1/025; G05G 5/05; B64D 29/06
See application file for complete search history.

(56) References Cited

U.S. PATENT DOCUMENTS

| 5,836,564 | A | 11/1998 | Duran |
| 6,189,832 | B1 | 2/2001 | Jackson |
| 6,629,712 | B2 | 10/2003 | Jackson |
| 10,906,661 | B2 * | 2/2021 | Shetzer .................. B64D 29/06 |

FOREIGN PATENT DOCUMENTS

| DE | 102015202875 A1 * | 9/2015 | .......... B60K 26/021 |
| DE | 102015214974 A1 * | 2/2017 | |

* cited by examiner

*Primary Examiner* — Adam D Rogers
(74) *Attorney, Agent, or Firm* — Getz Balich LLC

(57) ABSTRACT

An assembly is provided for an aircraft. This aircraft assembly includes an actuator and a cable assembly. The actuator includes a support structure, a handle structure and a guide system configured to guide movement of the handle structure longitudinally along the support structure between a first position and a second position. The guide system includes a first guide element and a second guide element. The first guide element includes a first spring element and is pivotally coupled to the handle structure at a handle structure pivot axis. The second guide element includes a second spring element and is pivotally coupled to the handle structure at the handle structure pivot axis. The cable assembly includes a sleeve and a cable projecting longitudinally out of the sleeve. The sleeve is attached to the support structure. The cable is coupled to the handle structure.

20 Claims, 6 Drawing Sheets

SPRING GUIDED HAND ACTUATOR FOR AIRCRAFT COMPONENT

BACKGROUND

1. Technical Field

This disclosure relates generally to an aircraft and, more particularly, to an actuator for actuating a component of the aircraft.

2. Background Information

An aircraft may include a component which is actuated with a hand actuator. Various types of hand actuators are known in the art. While these known hand actuators have various benefits, there is still room in the art for improvement.

SUMMARY OF THE DISCLOSURE

According to an aspect of the present disclosure, an assembly is provided for an aircraft. This aircraft assembly includes an actuator and a cable assembly. The actuator includes a support structure, a handle structure and a guide system configured to guide movement of the handle structure longitudinally along the support structure between a first position and a second position. The guide system includes a first guide element and a second guide element. The first guide element includes a first spring element and is pivotally coupled to the handle structure at a handle structure pivot axis. The second guide element includes a second spring element and is pivotally coupled to the handle structure at the handle structure pivot axis. The cable assembly includes a sleeve and a cable projecting longitudinally out of the sleeve. The sleeve is attached to the support structure. The cable is coupled to the handle structure.

According to another aspect of the present disclosure, another assembly is provided for an aircraft. This aircraft assembly includes a support structure, a handle structure, a slide, a first guide element and a second guide element. The support structure includes a handle mount and a track. The handle structure projects longitudinally through an aperture in the handle mount. The slide is coupled to the handle structure and is mated with the track. The slide is configured to move longitudinally along the track. The first guide element is pivotally coupled to the handle structure at a handle structure pivot axis. The first guide element is pivotally coupled to the support structure at a first support structure pivot axis. The first guide element includes a first spring element. The second guide element is pivotally coupled to the handle structure at the handle structure pivot axis. The second guide element is pivotally coupled to the support structure at a second support structure pivot axis which is offset from the first support structure pivot axis. The second guide element includes a second spring element.

According to still another aspect of the present disclosure, another assembly is provided for an aircraft. This aircraft assembly includes a support structure, a handle structure and a plurality of guide elements. The support structure includes a first wall, a second wall and a channel laterally between the first wall and the second wall. The handle structure projects longitudinally into the channel. The guide elements are pivotally coupled to the handle structure at a handle structure pivot axis. Each of the guide elements includes a spring element. The guide elements include a first lower guide element, a second lower guide element, a first upper guide element and a second upper guide element. The first lower guide element is pivotally coupled to the first wall at a lower support structure pivot axis. The second lower guide element is pivotally coupled to the second wall at the lower support structure pivot axis. The first upper guide element is pivotally coupled to the first wall at an upper support structure pivot axis. The second upper guide element is pivotally coupled to the second wall at the upper support structure pivot axis.

The first guide element and the second guide element may be disposed to opposing sides of the handle structure.

The support structure may include a wall. The first guide element may be pivotally coupled to the wall at a first support structure pivot axis. The second guide element may be pivotally coupled to the wall at a second support structure pivot axis which is offset from the first support structure pivot axis.

The second support structure pivot axis may be longitudinally aligned with the first support structure pivot axis.

The wall may be a first wall. The support structure may also include a second wall. The handle structure may be disposed laterally between the first wall and the second wall. The guide system may also include a third guide element and a fourth guide element. The third guide element may include a third spring element. The third guide element may be pivotally coupled to the handle structure at the handle structure pivot axis. The third guide element may be pivotally coupled to the second wall at a third support structure pivot axis. The fourth guide element may include a fourth spring element. The fourth guide element may be pivotally coupled to the handle structure at the handle structure pivot axis. The fourth guide element may be pivotally coupled to the second wall at a fourth support structure pivot axis which is offset from the third support structure pivot axis.

The third support structure pivot axis may be coaxial with the first support structure pivot axis. The fourth support structure pivot axis may be coaxial with the second support structure pivot axis.

The first guide element may pivot between seventy degrees and one-hundred and ten degrees about the handle structure pivot axis as the handle structure moves longitudinally from the first position to the second position. In addition or alternatively, the second guide element may pivot between seventy degrees and one-hundred and ten degrees about the handle structure pivot axis as the handle structure moves longitudinally from the first position to the second position.

The first guide element may have a first guide element centerline. The first guide element may extend along the first guide element centerline to the handle structure pivot axis. The second guide element may have a second guide element centerline. The second guide element may extend along the second guide element centerline to the handle structure pivot axis. The first guide element centerline may be angularly offset from the second guide element centerline by a first position angle when the handle structure is in the first position.

The first guide element centerline may be angularly offset from the second guide element centerline by a second position angle when the handle structure is in the second position.

The second position angle may be equal to the first position angle.

The first guide element centerline may be parallel with the second guide element centerline when the handle structure is in an intermediate position longitudinally between the first position and the second position.

The first spring element may be configured as or otherwise include a first coil spring. In addition or alternatively, the second spring element may be configured as or otherwise include a second coil spring.

The first spring element and the second spring element may each be compressed when the handle structure is in the first position. In addition or alternatively, the first spring element and the second spring element may each be compressed when the handle structure is in the second position.

The guide system may also include a track and a slide configured to move longitudinally along the track. The track may be configured with the support structure. The slide may be configured with the handle structure.

The handle structure pivot axis may be a centerline axis of the slide.

The support structure may include a handle mount. The handle structure may include a handle and a strut. The strut may project longitudinally out from the handle and through an aperture in the handle mount. The first guide element, the second guide element and the cable may be coupled to the strut.

The aircraft assembly may also include a cowl and a hold open rod. The cowl may be configured to pivot between a closed position and an open position. The hold open rod may be configured to hold the cowl in the open position. The actuator may be operatively coupled to the hold open rod through the cable.

The aircraft assembly may also include a lock operatively coupled to and actuatable by the actuator through the cable.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
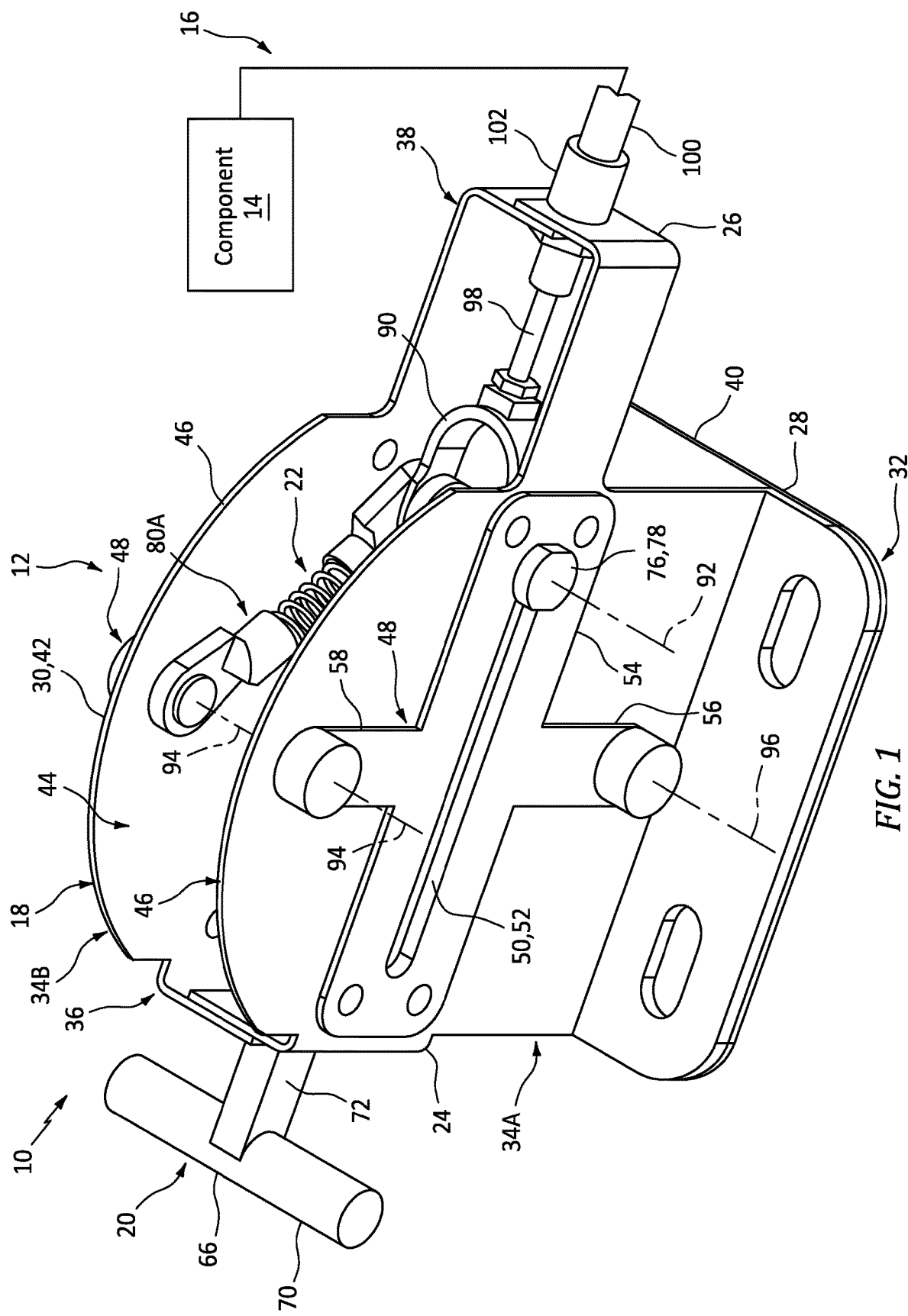
FIG. 1 is a partial perspective illustration of an assembly for an aircraft with a hand actuator.

FIG. 1 illustrates an assembly 10 for an aircraft such as, but not limited to, a commercial airliner or cargo plane. This aircraft assembly 10 includes a positive locking hand (e.g., manual) actuator 12 and another component 14 of the aircraft operatively coupled to the hand actuator 12 through a cable assembly 16 (and/or another linkage arrangement). The aircraft component 14 may be configured as or otherwise include a hold open rod ("HOR") for a nacelle cowl or another type of aircraft door or hatch. The aircraft component 14 may also or alternatively be configured as or otherwise include a lock for still another component of the aircraft; e.g., the hold open rod, the nacelle cowl or another type of aircraft door or hatch. The present disclosure, however, is not limited to the foregoing exemplary aircraft component configurations. The aircraft component 14, for example, may be configured as or otherwise include any device (or devices) which may be actuated or otherwise moved utilizing the hand actuator 12; e.g., the hand actuator 12 may be or may be coupled to an opening mechanism for an aircraft door or hatch. The hand actuator 12 of FIG. 1 includes a support structure 18, a handle structure 20 and a positive locking guide system 22.

The support structure 18 extends longitudinally between and to a longitudinal first end 24 of the support structure 18 and a longitudinal second end 26 of the support structure 18. The support structure 18 extends vertically between and to a lower side 28 of the support structure 18 and an upper side 30 of the support structure 18. Note, the terms "lower" and "upper" may be used herein to describe an orientation of the hand actuator 12 and its various components with respect to the arrangement shown in FIG. 1. The terms "lower" and "upper", however, are not intended to limit the orientation of the hand actuator 12 and its various components to any specific orientation relative to gravity. The support structure 18 of FIG. 1 includes a mounting base 32, one or more walls 34A and 34B (generally referred to as "34"), a handle mount 36 and a cable mount 38.

The mounting base 32 is disposed at (e.g., on, adjacent or proximate) the support structure lower side 28. This mounting base 32 is configured to provide a platform for mounting the hand actuator 12 to a (e.g., stationary) structure of the aircraft. The mounting base 32 of FIG. 1 extends longitudinally from the support structure first end 24 (e.g., towards the support structure second end 26) to a second end 40 of the mounting base 32, which mounting base second end 40 of FIG. 1 is longitudinally spaced (e.g., recessed) inward from the support structure second end 26. However, in other embodiments, it is contemplated the mounting base second end 40 may alternatively be located at the support structure second end 26.

Each of the walls 34 is connected to (e.g., formed integral with or otherwise attached to) and may be perpendicular to the mounting base 32. Each of the walls 34 projects vertically out from the mounting base 32 to a respective distal end 42 of that wall 34, which wall end 42 is disposed at the support structure upper side 30. Each of the walls 34 of FIG. 1 extends longitudinally from the support structure first end 24 (e.g., towards the support structure second end 26) to the mounting base second end 40. The walls 34 are laterally spaced apart from one another thereby forming a channel 44 in the support structure 18. This channel 44 extends longitudinally along each of the walls 34. The channel 44 extends laterally within the support structure 18 between the walls 34. The channel 44 of FIG. 1 extends vertically into the support structure 18 from the support structure upper side 30 to the mounting base 32; see also FIG. 2.

Each wall 34 may include a wall plate 46 and a wall frame 48 connected (e.g., mounted) to the wall plate 46. The wall frame 48 may provide a structural backbone and/or otherwise structurally reinforce the wall plate 46. The wall frame 48 of FIG. 1 also provides the respective wall 34 with a track 50. The track 50 of FIG. 1 is configured as a slot 52. This slot 52 extends longitudinally within the wall 34 and its respective wall frame 48 between opposing longitudinal ends of the slot 52. The slot 52 extends vertically within the wall 34 and its respective wall frame 48 between opposing vertical side of the slot 52. The slot 52 extends laterally through the wall 34 and its respective wall frame 48 to the channel 44.

The wall frame 48 of FIG. 1 includes a track section 54, a lower wall mount 56 and an upper wall mount 58. The track section 54 forms the respective track 50 and its slot 52. The lower wall mount 56 of FIG. 1 is configured as a finger (e.g., a rib) which projects vertically (e.g., downward) out from the track section 54 towards the support structure lower side 28. The upper wall mount 58 of FIG. 1 is configured as a finger (e.g., a rib) which projects vertically (e.g., upward) out from the track section 54 towards the support structure upper side 30.

Figure 2:
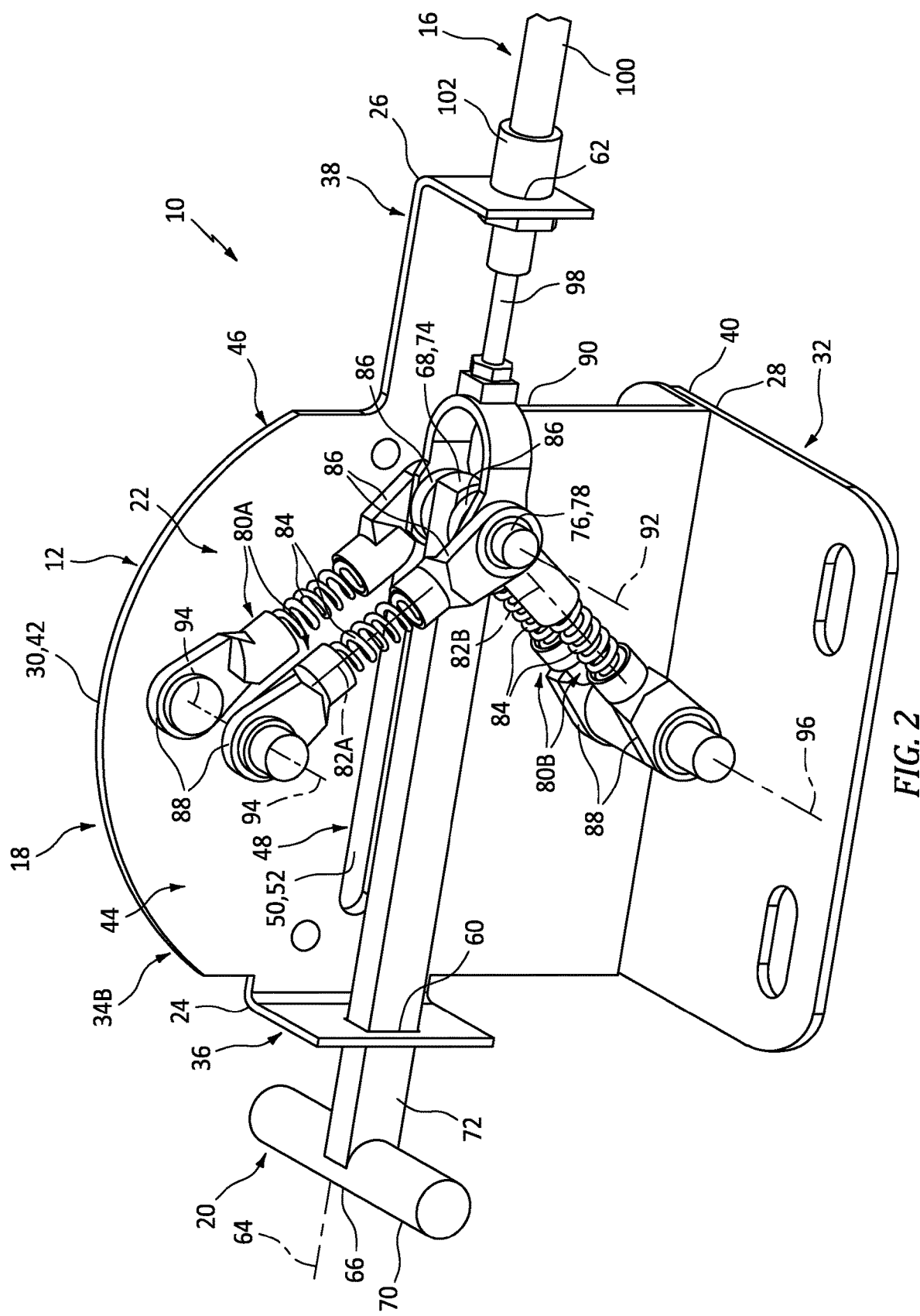
FIG. 2 is a partial perspective cutaway illustration of the aircraft assembly.

The handle mount 36 is disposed at the support structure first end 24. The handle mount 36 may be vertically aligned with the track section 54 of each wall frame 48. The handle mount 36 of FIG. 1 is configured as a mounting bracket which is connected to (e.g., formed integral with or otherwise attached to) and extends laterally between the walls 34 and their wall plates 46. Referring to FIG. 2, the handle mount 36 includes a handle aperture 60. This handle aperture 60 extends longitudinally through the handle mount 36 to the channel 44. The handle aperture 60 of FIG. 2 extends vertically and laterally within the handle mount 36.

Referring to FIG. 1, the cable mount 38 is disposed at the support structure second end 26. The cable mount 38 may be vertically aligned with the track section 54 of each wall frame 48. The cable mount 38 of FIG. 1 is configured as a mounting bracket which is connected to (e.g., formed integral with or otherwise attached to) and extends laterally between the walls 34 and their wall plates 46. The cable mount 38 of FIG. 1 also projects longitudinally out from the walls 34 to the support structure second end 26. Referring to FIG. 2, the cable mount 38 includes a cable aperture 62. This cable aperture 62 extends longitudinally through the cable mount 38 to the channel 44. The cable aperture 62 of FIG. 2 has a circular cross-sectional geometry.

The handle structure 20 of FIG. 2 extends longitudinally along a longitudinal centerline 64 of the handle structure 20 between and to a longitudinal first end 66 of the handle structure 20 and a longitudinal second end 68 of the handle structure 20. The handle structure 20 of FIG. 2 includes a handle 70 (e.g., a hand grip) and a strut 72. The handle 70 is disposed at the handle structure first end 66. The strut 72 is connected to (e.g., formed integral with or otherwise attached to) and may be perpendicular to the handle 70. The strut 72 projects longitudinally out from the handle 70 to a distal end 74 of the strut 72, which strut end 74 is disposed at the handle structure second end 68.

The handle structure 20 is mated with the support structure 18 and its handle mount 36. The strut 72 of FIG. 2, for example, is received by the handle aperture 60. More particularly, the strut 72 projects longitudinally out from the handle 70, through the handle aperture 60, and into the channel 44. The handle 70 is thereby disposed outside of the support structure 18 towards the support structure first end 24. The strut end 74 is disposed within the support structure 18 and its channel 44. The handle structure 20 and its strut 72 are also arranged laterally between the walls 34; see also FIG. 1.

Figure 3:
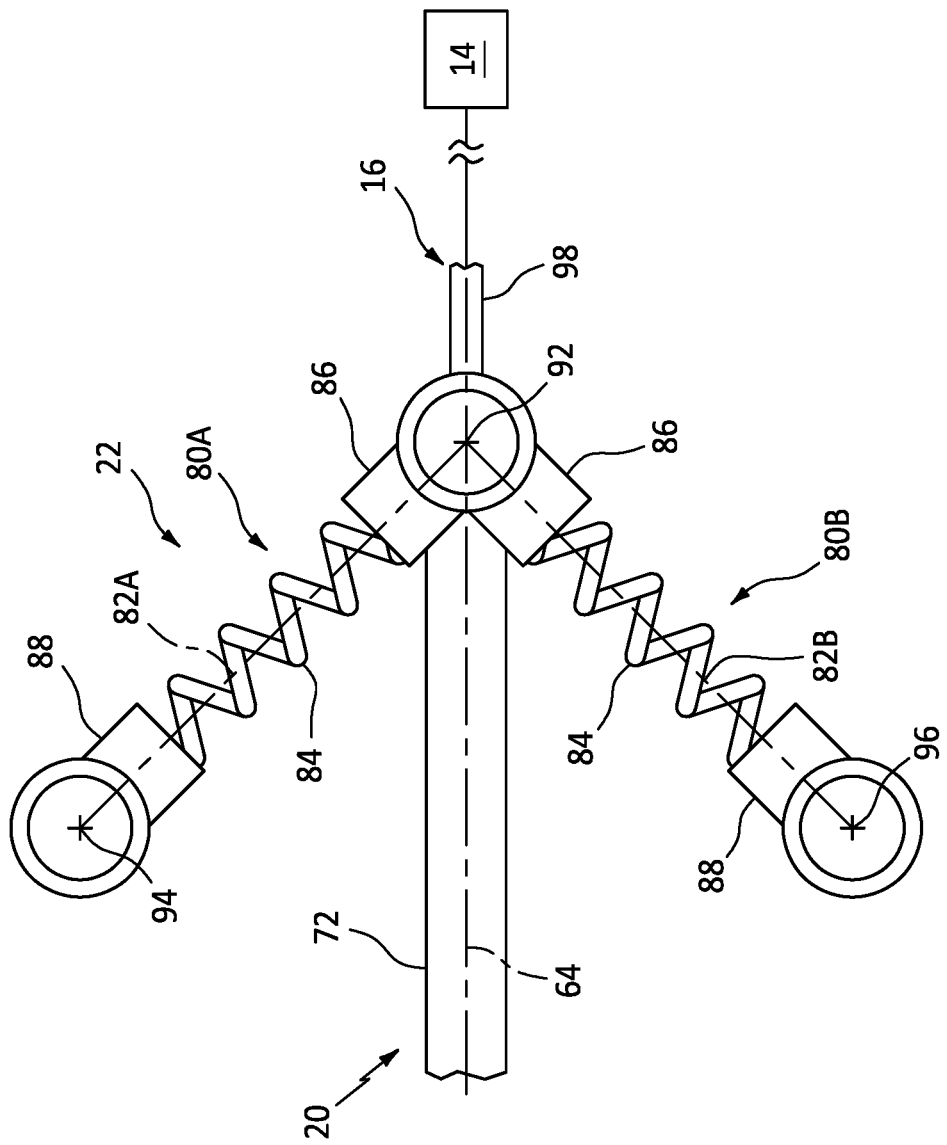
FIG. 3 is a partial schematic illustration of the aircraft assembly with a handle structure in a first position.
Figure 4:
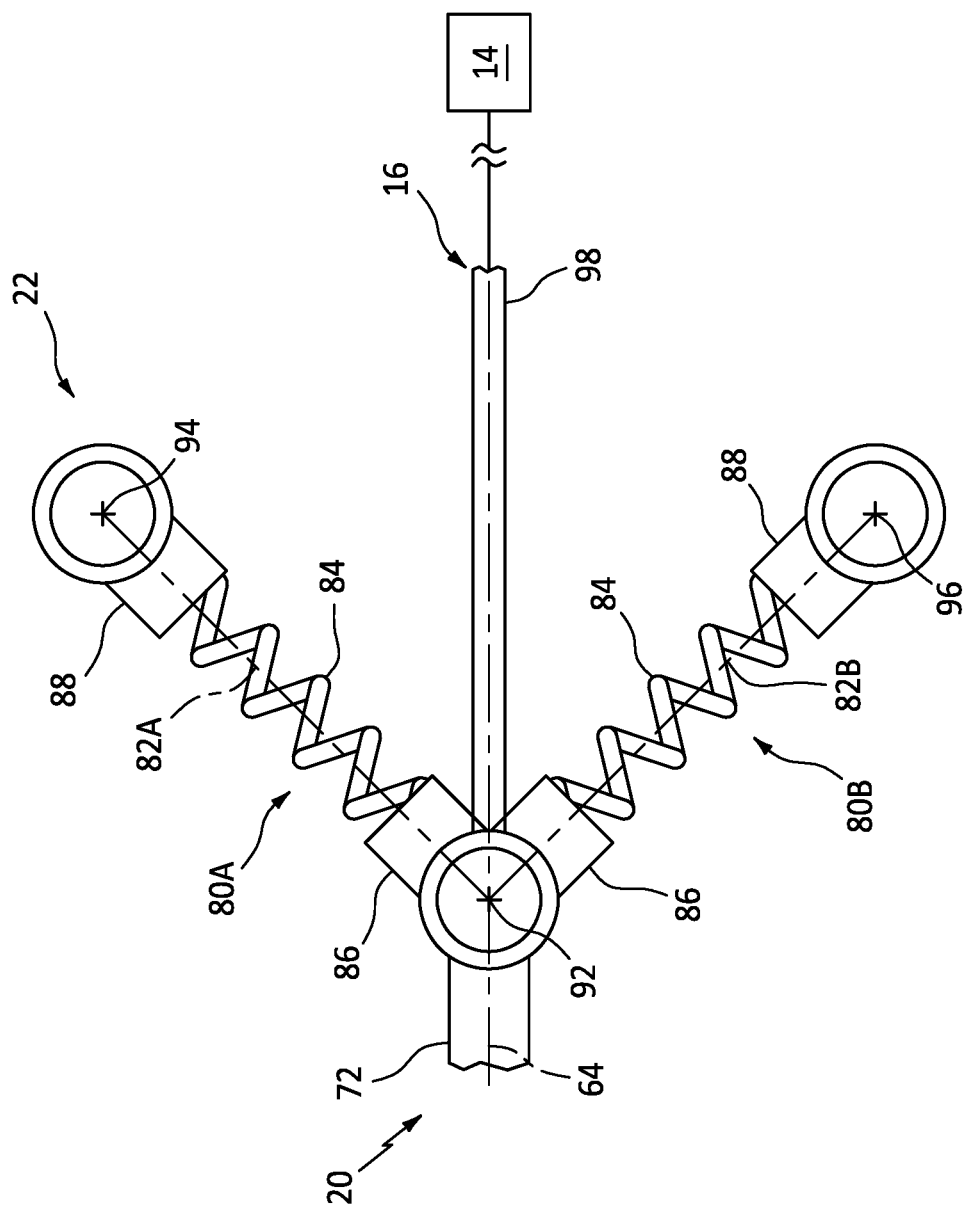
FIG. 4 is a partial schematic illustration of the aircraft assembly with the handle structure in a second position.

The guide system 22 is configured to guide longitudinal movement of the handle structure 20 along/relative to the support structure 18 between a first position (see FIG. 3) and a second position (see FIG. 4). The guide system 22 of FIG. 2, for example, includes the tracks 50 and one or more slides 76 (one visible in figures; see also FIG. 1). Here, the slides 76 are configured as part of a coupling pin 78. The guide system 22 of FIG. 2 also includes a plurality of guide elements 80A and 80B (generally referred to as "80").

Each of the guide elements 80A, 80B has a centerline 82A, 82B (generally referred to as "82"), and extends along that guide element centerline 82 between a first end of the respective guide element 80 and a second end of the respective guide element 80. Each guide element 80 of FIG. 2 includes a spring element 84 (e.g., a coil spring), a first end fitting 86 and a second end fitting 88. The spring element 84 is disposed between the first end fitting 86 and the second end fitting 88 along the respective guide element centerline 82. The spring element 84 is also attached to the first end fitting 86 and the second end fitting 88. The first end fitting 86 is disposed at the first end of the respective guide element 80. The second end fitting 88 is disposed at the second end of the respective guide element 80.

The upper guide elements 80A are arranged substantially vertically above the handle structure 20, and on opposing lateral sides of the handle structure 20. The lower guide elements 80B are arranged substantially vertically below the handle structure 20, and on opposing lateral sides of the handle structure 20. Here, the first end fitting 86 of each upper guide element 80A is disposed laterally between the first end fitting 86 of a respective (e.g., laterally neighboring) lower guide element 80B and the strut 72. The coupling pin 78 pivotally couples each guide element 80 as well as a yoke 90 of the cable assembly 16 to the handle structure 20 and its strut 72. The coupling pin 78 of FIG. 2, for example, may extend sequentially through the first end fitting 86 of one upper guide element 80A, a first arm of the yoke 90, the first end fitting 86 of one lower guide element 80B, the strut 72, the first end fitting 86 of the other lower guide element 80B, a second arm of the yoke 90 and the first end fitting 86 of the other upper guide element 80A between the slides 76. With this arrangement, each of the actuator members 80 and 90 is pivotally coupled to the handle structure 20 and its strut 72 at a common handle structure pivot axis 92, which handle structure pivot axis 92 is perpendicular to and may be coincident with the longitudinal centerline 64. Each of the slides 76 is mated with a respective one of the tracks 50 and its slot 52 (see also FIG. 1). The slides 76 may thereby guide movement of the handle structure 20 at its second end 68 longitudinally along the tracks 50.

The second end fitting 88 of each upper guide element 80A is pivotally coupled to a respective wall 34 at a respective upper support structure pivot axis 94. The second end fitting 88 of each upper guide element 80A, for example, may be pinned to a respective one of the upper wall mounts 58 (see also FIG. 1). Here, the upper support structure pivot axes 94 are coaxial. Each upper support structure pivot axis 94 is also vertically offset (e.g., in a vertical upward direction towards the support structure upper side 30) from the handle structure pivot axis 92 and the tracks 50. Similarly, the second end fitting 88 of each lower guide element 80B is pivotally coupled to a respective wall 34 at a respective lower support structure pivot axis 96. The second end fitting 88 of each lower guide element 80B, for example, may be pinned to a respective one of the lower wall mounts 56 (see also FIG. 1). Here, the lower support structure pivot axes 96 are coaxial. Each lower support structure pivot axis 96 is also vertically offset (e.g., in a vertical downward direction towards the support structure lower side 28) from the handle structure pivot axis 92 and the tracks 50. Each lower support structure pivot axis 96 may also be longitudinally aligned with each upper support structure pivot axis 94 along the longitudinal centerline 64. With this arrangement, the lower guide elements 80B may substantially mirror the upper guide elements 80A about the handle structure 20 and its strut 72. Moreover, each guide element 80 also flexibly couples the handle structure 20 at its second end 68 to the support structure 18 and its respective wall 34.

The cable assembly 16 of FIG. 2 includes a cable 98, a sleeve 100 and the yoke 90. The cable 98 projects longitudinally out of the sleeve 100 to a distal end of the cable 98. The cable 98 is connected to the yoke 90 at its distal end. This cable 98 is operable to move (e.g., slide) within the sleeve 100. By contrast, the sleeve 100 is mounted (e.g., fixedly attached) to the cable mount 38. A fitting 102, for example, secures (e.g., longitudinally anchors) the sleeve 100 to the cable mount 38, and the cable 98 projects through the cable mount 38, out of the sleeve 100 and longitudinally into the channel 44 to the yoke 90. The yoke 90 pivotally couples the cable 98 to the handle structure 20 about the handle structure pivot axis 92.

With the foregoing arrangement, the guide elements 80 are operable to bias and substantially maintain the handle structure pivot axis 92 at a vertical intermediate (e.g., centered) position between the upper and the lower support structure pivot axes 94 and 96. Each of the spring elements 84, for example, may be maintained in some degree of compression and push the handle structure pivot axis 92 to the vertical intermediate position; e.g., at various longitudinal slide positions along the tracks 50. Each slide 76 therefore may subject the respective track 50 to very little if any vertical loads as the handle structure 20 is longitudinally moved between the first position (see FIG. 3) and the second position (see FIG. 4). By reducing vertical loads between the slides 76 and the tracks 50, the guide system 22 may reduce wear to the slides 76 and/or the tracks 50 which may otherwise occur. Moreover, the spring elements 84 may bias the handle structure 20 to each of the first and the second positions. The spring elements 84 may thereby positively lock the hand actuator 12 in the first or the second position.

As the handle structure 20 is pulled from the first position of FIG. 3 to the second position of FIG. 4, the handle structure 20 pulls the cable 98 and may thereby actuate a first operation of the aircraft component 14. As the handle structure 20 is pushed from the second position of FIG. 4 to the first position of FIG. 3, the handle structure 20 pushes the cable 98 and may thereby actuate a second (e.g., opposite, reverser, etc.) operation of the aircraft component 14.

Figure 5:
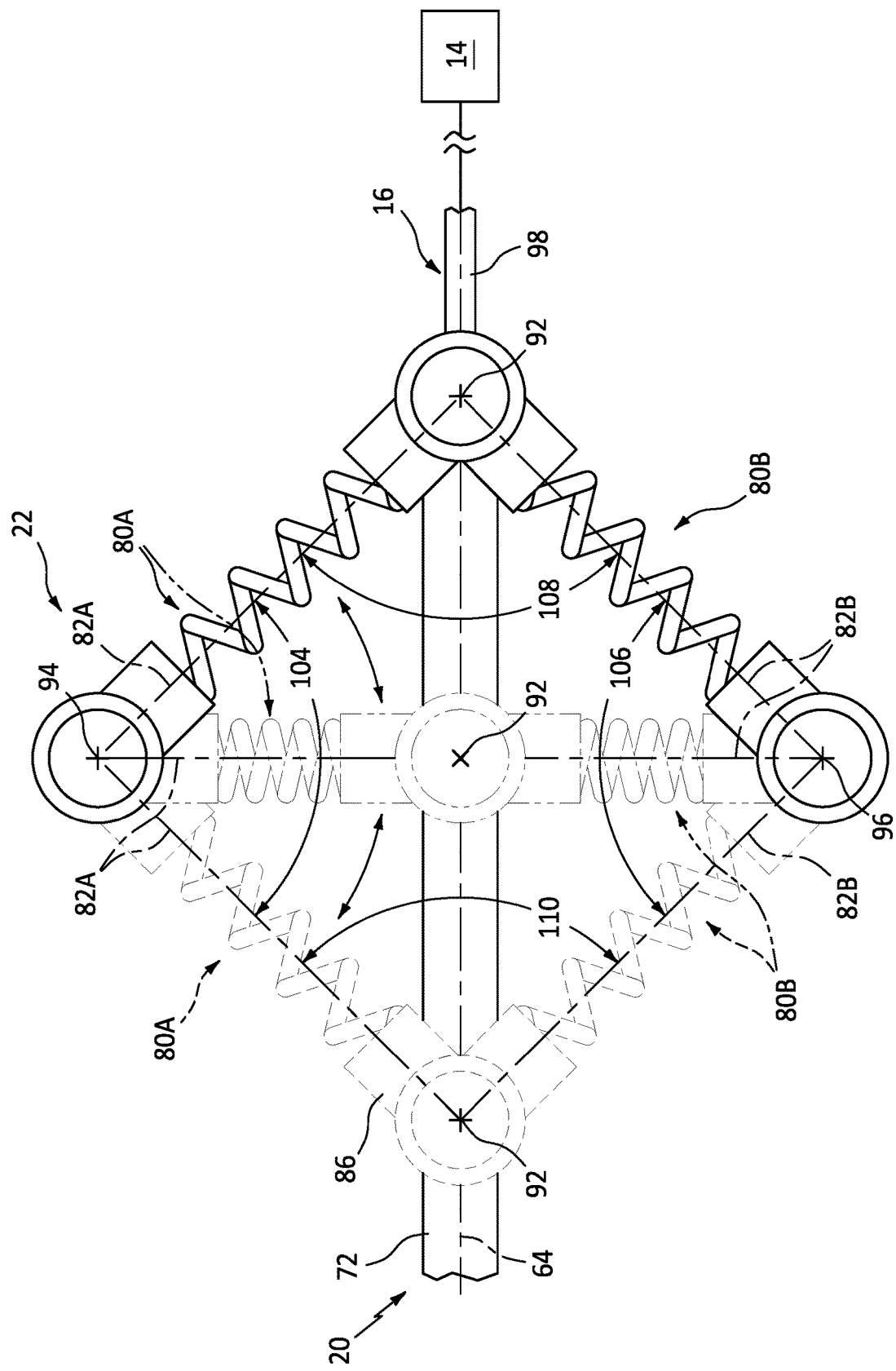
FIG. 5 is a partial schematic illustration of the aircraft assembly depicting movement of the handle structure between the first position and the second position.

Referring to FIG. 5, moving between the first position (see solid line guide elements 80; see also FIG. 3) and the second position (see left dashed line guide elements 80; see also FIG. 4), each upper guide element 80A pivots a first number of degrees 104 about the handle structure pivot axis 92/about the upper support structure pivot axis 94. This first number of degrees 104 may be between seventy degrees (70°) and one-hundred and ten degrees (110°); e.g., between eighty degrees (80°) and one-hundred degrees (100°). Similarly, each lower guide element 80B pivots a second number of degrees 106 about the handle structure pivot axis 92/about the lower support structure pivot axis 96. This second number of degrees 106 may be between seventy degrees (70°) and one-hundred and ten degrees (110°); e.g., between eighty degrees (80°) and one-hundred degrees (100°). The second number of degrees 106 may also be equal to and congruent with the first number of degrees 104.

When the handle structure 20 is in the first position (see also FIG. 3), the centerline 82A of each upper guide element 80A is angularly offset from the centerline 82B of each lower guide element 80B by an included (non-zero) first position angle 108. This first position angle 108 may be between seventy degrees (70°) and one-hundred and ten degrees) (110°; e.g., between eighty degrees (80°) and one-hundred degrees (100°). Moreover, the longitudinal centerline 64 may be angularly centered between the centerlines 82A and 82B.

When the handle structure 20 is in the second position (see also FIG. 4), the centerline 82A of each upper guide element 80A is angularly offset from the centerline 82B of each lower guide element 80B by an included (non-zero) second position angle 110. This second position angle 110 may be between seventy degrees (70°) and one-hundred and ten degrees) (110°; e.g., between eighty degrees (80°) and one-hundred degrees (100°). The second position angle 110 may also be equal to and congruent with the first position angle 108. Moreover, the longitudinal centerline 64 may be angularly centered between the centerlines 82A and 82B.

When the handle structure 20 is in an intermediate (e.g., mid, centered, etc.) position (see center dashed line guide elements 80) longitudinally between the first position and the second position, the centerline 82A of each upper guide element 80A may be parallel with the centerline 82B of each lower guide element 80B. Each centerline 82 may thereby be perpendicular to the longitudinal centerline 64. Note, this intermediate position may be a kinematically unstable (e.g., resting) position where the spring elements 84 may have a tendency to push the handle structure 20 longitudinally to the first position (see also FIG. 3) or the first position (see also FIG. 4), where the first and the second positions may be kinematically stable (e.g., resting) positions.

Figure 6:
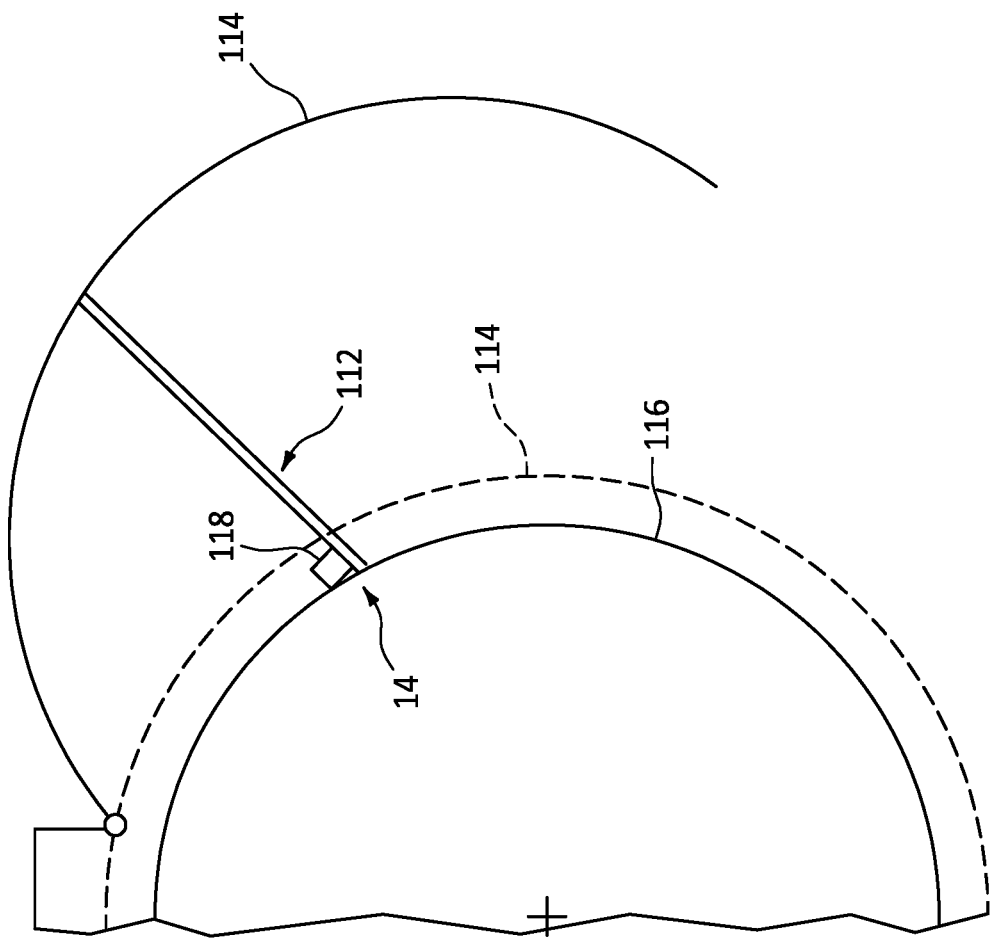
FIG. 6 is a partial schematic illustration of the aircraft assembly with a hold open rod arranged with a cowl.

FIG. 6 illustrates the aircraft component 14 as (or part of) a hold open rod 112 for a fan cowl 114. The fan cowl 114 of FIG. 6 is configured to move (e.g., pivot) between a closed position (see dashed line) and an open position (see solid line). When the fan cowl 114 is in the closed position, the fan cowl 114 provides an aerodynamic cover over a fan case 116 of a gas turbine engine. When the fan cowl 114 is in the open position, access is provided to the fan case 116 and components arranged with (e.g., mounted to) the fan case 116. In this open position, the hold open rod 112 is configured to hold open the fan cowl 114. Here, the hold open rod 112, in general, or a position lock 118 for the hold open rod 112 may be configured as the aircraft component 14 actuated by the hand actuator 12 of FIG. 1. The present disclosure, however, is not limited to such an arrangement. The hold open rod 112, for example, may alternatively hold a thrust reverser section or any other door or hatch in its open position. Furthermore, as discussed above, the aircraft component 14 is not limited to hold open rod or lock applications.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft, comprising:
an actuator including a support structure, a handle structure and a guide system configured to guide movement of the handle structure longitudinally along the support structure between a first position and a second position, the guide system including a first guide element and a second guide element, the first guide element comprising a first spring element and pivotally coupled to the handle structure at a handle structure pivot axis, and the second guide element comprising a second spring element and pivotally coupled to the handle structure at the handle structure pivot axis; and a cable assembly including a sleeve and a cable projecting longitudinally out of the sleeve, the sleeve attached to the support structure, and the cable coupled to the handle structure.

2. The assembly of claim 1, wherein the first guide element and the second guide element are disposed to opposing sides of the handle structure.

3. The assembly of claim 1, wherein
the support structure comprises a wall;
the first guide element is pivotally coupled to the wall at a first support structure pivot axis; and
the second guide element is pivotally coupled to the wall at a second support structure pivot axis which is offset from the first support structure pivot axis.

4. The assembly of claim 3, wherein the second support structure pivot axis is longitudinally aligned with the first support structure pivot axis.

5. The assembly of claim 3, wherein
the wall is a first wall, and the support structure further comprises a second wall;
the handle structure is disposed laterally between the first wall and the second wall;
the guide system further includes a third guide element and a fourth guide element;
the third guide element comprises a third spring element, the third guide element is pivotally coupled to the handle structure at the handle structure pivot axis, and the third guide element is pivotally coupled to the second wall at a third support structure pivot axis; and
the fourth guide element comprises a fourth spring element, the fourth guide element is pivotally coupled to the handle structure at the handle structure pivot axis, and the fourth guide element is pivotally coupled to the second wall at a fourth support structure pivot axis which is offset from the third support structure pivot axis.

6. The assembly of claim 5, wherein
the third support structure pivot axis is coaxial with the first support structure pivot axis; and
the fourth support structure pivot axis is coaxial with the second support structure pivot axis.

7. The assembly of claim 1, wherein at least one of
the first guide element pivots between seventy degrees and one-hundred and ten degrees about the handle structure pivot axis as the handle structure moves longitudinally from the first position to the second position; or
the second guide element pivots between seventy degrees and one-hundred and ten degrees about the handle structure pivot axis as the handle structure moves longitudinally from the first position to the second position.

8. The assembly of claim 1, wherein
the first guide element has a first guide element centerline, and the first guide element extends along the first guide element centerline to the handle structure pivot axis;
the second guide element has a second guide element centerline, and the second guide element extends along the second guide element centerline to the handle structure pivot axis; and
the first guide element centerline is angularly offset from the second guide element centerline by a first position angle when the handle structure is in the first position.

9. The assembly of claim 8, wherein the first guide element centerline is angularly offset from the second guide element centerline by a second position angle when the handle structure is in the second position.

10. The assembly of claim 9, wherein the second position angle is equal to the first position angle.

11. The assembly of claim 8, wherein the first guide element centerline is parallel with the second guide element centerline when the handle structure is in an intermediate position longitudinally between the first position and the second position.

12. The assembly of claim 1, wherein at least one of
the first spring element comprises a first coil spring; or
the second spring element comprises a second coil spring.

13. The assembly of claim 1, wherein at least one of
the first spring element and the second spring element are each compressed when the handle structure is in the first position; or
the first spring element and the second spring element are each compressed when the handle structure is in the second position.

14. The assembly of claim 1, wherein
the guide system further includes a track and a slide configured to move longitudinally along the track;
the track configured with the support structure; and
the slide configured with the handle structure.

15. The assembly of claim 14, wherein the handle structure pivot axis is a centerline axis of the slide.

16. The assembly of claim 1, wherein
the support structure comprises a handle mount;
the handle structure includes a handle and a strut, the strut projects longitudinally out from the handle and through an aperture in the handle mount; and
the first guide element, the second guide element and the cable are coupled to the strut.

17. The assembly of claim 1, further comprising:
a cowl configured to pivot between a closed position and an open position; and
a hold open rod configured to hold the cowl in the open position, the actuator operatively coupled to the hold open rod through the cable.

18. The assembly of claim 1, further comprising a lock operatively coupled to and actuatable by the actuator through the cable.

19. An assembly for an aircraft, comprising:
a support structure including a handle mount and a track;
a handle structure projecting longitudinally through an aperture in the handle mount;
a slide coupled to the handle structure and mated with the track, the slide configured to move longitudinally along the track;
a first guide element pivotally coupled to the handle structure at a handle structure pivot axis, the first guide element pivotally coupled to the support structure at a first support structure pivot axis, and the first guide element comprising a first spring element; and
a second guide element pivotally coupled to the handle structure at the handle structure pivot axis, the second guide element pivotally coupled to the support structure at a second support structure pivot axis which is offset from the first support structure pivot axis, and the second guide element comprising a second spring element.

20. An assembly for an aircraft, comprising:
a support structure including a first wall, a second wall and a channel laterally between the first wall and the second wall;
a handle structure projecting longitudinally into the channel; and a plurality of guide elements pivotally coupled to the handle structure at a handle structure pivot axis, each of the plurality of guide elements comprising a spring element, and the plurality of guide elements including a first lower guide element, a second lower guide element, a first upper guide element and a second upper guide element;

the first lower guide element pivotally coupled to the first wall at a lower support structure pivot axis, and the second lower guide element pivotally coupled to the second wall at the lower support structure pivot axis; and the first upper guide element pivotally coupled to the first wall at an upper support structure pivot axis, and the second upper guide element pivotally coupled to the second wall at the upper support structure pivot axis.

* * * * *